May 8, 1951 L. H. DAVIS ET AL 2,551,790

POSITIONING STRUCTURE FOR CATHODE-RAY TUBES

Filed April 1, 1949 2 Sheets-Sheet 1

INVENTORS
LEWIS H. DAVIS
& SIMEON I. TOURSHOU
BY
Paul V. Mitchell
ATTORNEY

POSITIONING STRUCTURE FOR CATHODE-RAY TUBES

Filed April 1, 1949 2 Sheets-Sheet 2

INVENTORS
LEWIS H. DAVIS
& SIMEON I. TOURSHOU
BY
ATTORNEY

Patented May 8, 1951 2,551,790

UNITED STATES PATENT OFFICE 2,551,790

POSITIONING STRUCTURE FOR CATHODE-RAY TUBES

Lewis H. Davis, Wayne, and Simeon I. Tourshou, Philadelphia, Pa., assignors to Radio Corporation of America, a corporation of Delaware Application April 1, 1949, Serial No. 84,798

4 Claims. (Cl. 250—141)

The present invention relates to supporting and positioning devices for cathode ray tubes, and, more particularly, but not necessarily exclusively, to an improved means for positioning the target end of a high voltage cathode ray tube in a manner to provide safety of operation. In accordance with one aspect of the invention, the tube positioning means of this invention is in the form of an insulating member which serves as a mask to define the areas of the target face of the tube to be viewed.

In electrical apparatus employing high voltage cathode ray tubes, such as television receivers and oscillographs, it is necessary to protect a user of the apparatus from contact with high voltage parts including parts which may become charged to a high voltage. Moreover, the protecting device should be such as to facilitate convenient access, when desired, to the tube and the supporting parts for the tube. In a television receiver the entertainment value of an image produced on the screen of the cathode ray tube in operation of the receiver is enhanced if the image area of the tube is outlined by a mask which conceals the rim and, if desired, the unilluminated area of the target face of the tube.

The principal aim of the present invention is to provide novel means for protecting the user of cathode ray tube apparatus from high voltage parts which includes a provision for outlining the portion of the cathode ray tube to be viewed. Another and closely related aim or object is to provide a novel insulating mask for a cathode ray tube which may be readily attached to the cabinet or support with which it is used.

A further object is to provide a novel insulating mask for a cathode ray tube having means for correctly positioning the cathode ray tube in the forward direction with respect to a cabinet or other support or holder for the mask.

A still further object is to provide, in a novel manner, for obtaining a high voltage connection for a cathode ray tube.

Other objects and advantages of the invention will, of course, become apparent and immediately suggest themselves to those skilled in the art to which the invention is directed from a reading of the following specification in connection with the accompanying drawings in which.

Figure 1:
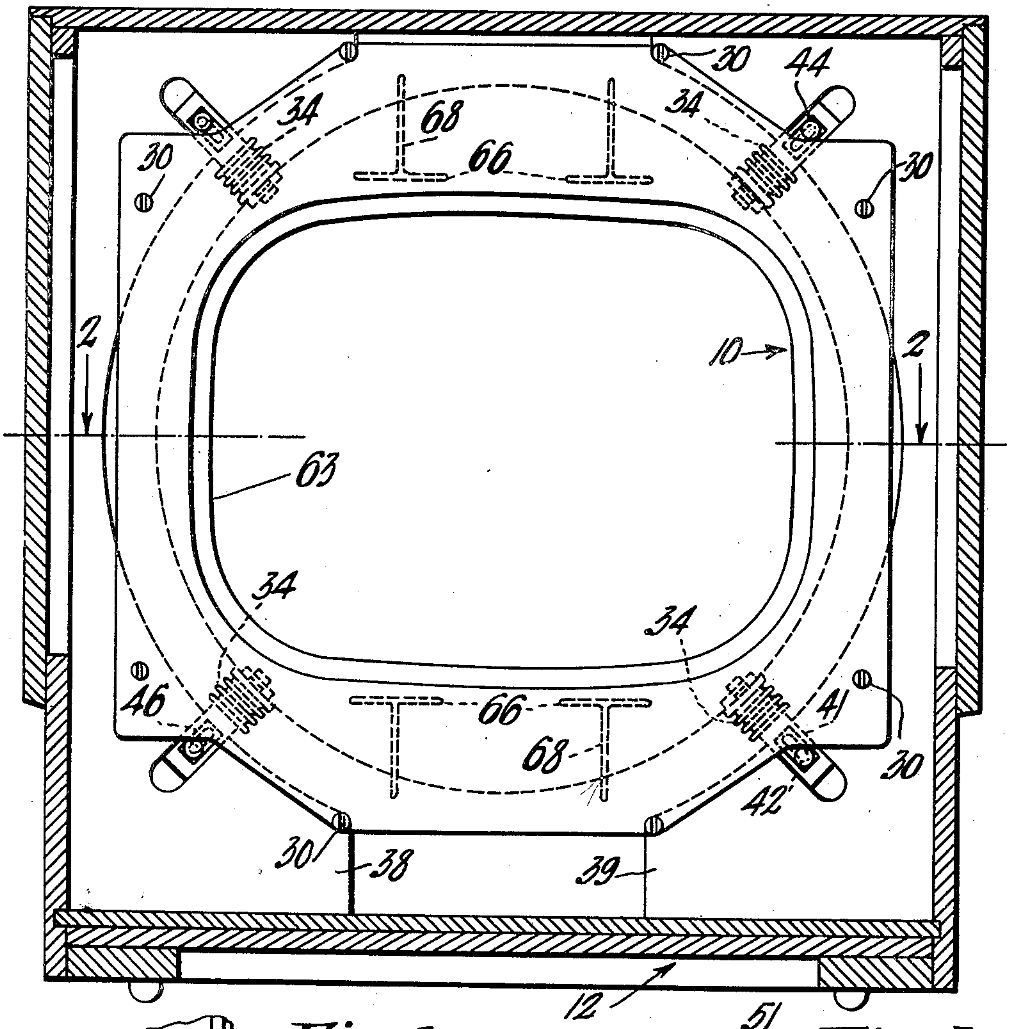
Fig. 1 is a sectional view in front elevation of cathode ray tube apparatus embodying the novel positioning structure of this invention, the section being taken on line 1—1 of Fig. 2.

Referring now to the drawing, reference numeral 10 indicates the masking means of this invention in its entirety which is shown illustratively as being located in a cabinet or housing 12 which serves to house cathode ray tube apparatus, such for example as a television receiver having suitable means (not shown) for energizing and operating a cathode ray tube 14 so that the latter will produce an image on its active exposed target face 16. The tube 14 is of the high voltage type, for example, having a conical metal portion 18 and a portion of glass 20 which includes the tube neck 21. A support 23 is indicated for the neck portion of the tube and this may comprise, for example, a deflecting yoke and deflecting yoke supporting means such as is shown in Patent No. 2,428,928 granted to E. B. Cain on October 14, 1947. Magnetic appliances, such as the deflecting yoke, focusing coil, and the like, associated with the cathode ray tube 14 are not shown in detail as they form no part of the present invention. The metal cone 18 of the tube 14 is connected to a suitable source (not shown) of high positive potential as indicated schematically at reference character 22. By way of example, the tube 14 may be a type 16AP4 metal cathode ray tube and in operation of this tube the metal cone may operate at 15,500 volts above ground. It is, therefore, necessary that the metal cone 18 be insulated from any grounded portion of the receiver. Also, in the interest of safety, it is desirable to provide means for preventing accidental contact with parts at high voltage.

The cabinet 12 has a front wall 24 which carries a panel 26 having a frame or the like 28 through which the image appearing on the target face 16 of the tube is visible. The mask 10 of the invention is secured to strips or blocks 29, for example by screws 30, so that the mask is spaced from the back of the panel 26. A transparent member 31, of safety glass or the like, is located between the back of the panel 26 and the front of the mask 10.

The outer rim 33 of the end of the kinescope is centered and supported with respect to the mask 10 by means of a plurality (four in the present instance) of insulators 34 which are slidably carried by panel portions 38 and 39. The material of which the insulators are formed must have a high insulating value and "Melamine" No. 1502 of the American Cyanamid Co. is suitable for the purpose. Each insulator 34 is provided with a stem 41 which has a slot 42 for slidably receiving the shank of a bolt 44. The head of the bolt is accommodated by an elongated recess 46. The ends of the bolts 44 which project beyond the panels 38 and 39 receive nuts in the usual manner. The slidable connection of the insulators 34 provides for centering of the tube face 16 within the frame 28 and the opening in the mask 10.

Figure 3:
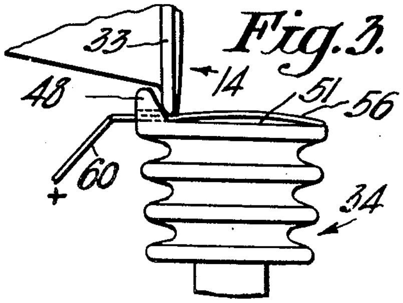
Fig. 3 is a fragmentary view in side elevation of a slight modification showing a second anode connection in accordance with a preferred form of the invention.
Figure 4:
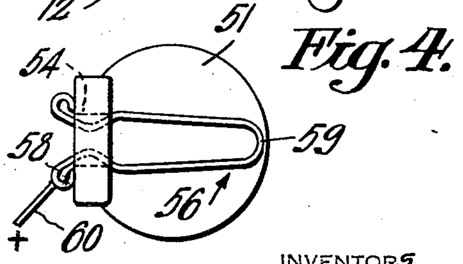
Fig. 4 is a view in plan of the arrangement of Fig. 3.

The insulators may be provided with spring members (not shown in Figs. 1 and 2) for contacting the metal cone 18 of the tube and one or more of these spring members may serve as the connection which is indicated schematically at 22. Figs. 3 and 4 of the drawing illustrate the spring member in position on the end of an insulator. Each insulator 34, as shown more in detail by Figs. 3 and 4, is provided with a lip 48 which overhangs the inner side of the rim 33 of the tube 14. The top surface 51 of the insulator is slightly concave so as to conform to the configuration of the tube rim thereby to provide a more secure seat for the tube rim. A slot 54 in the lip 48 of the insulator receives a high voltage connector in the form of spring member 56. The spring member is U-shaped substantially as shown and includes a reversely-bent section 58 in each leg which engages with the end of the slot 54. The end 59 of the spring member rests on the top 51 of the insulator and the upwardly bowed legs of the spring member 56 press upwardly into contact with the rim 33 of the conical metal part 18 of the tube 14. A high voltage lead or connector 60 is connected to one of the legs of the spring member 56, this lead or connector serving as the connection 22 of Fig. 1 of the drawings. The remaining springs, three in number in the illustrative example, on the other insulators 34 maintain contact with the insulators and reduce the possibility of air gaps between the tube and the insulators, and electrostatic charge sparking across the gaps.

Figure 2:
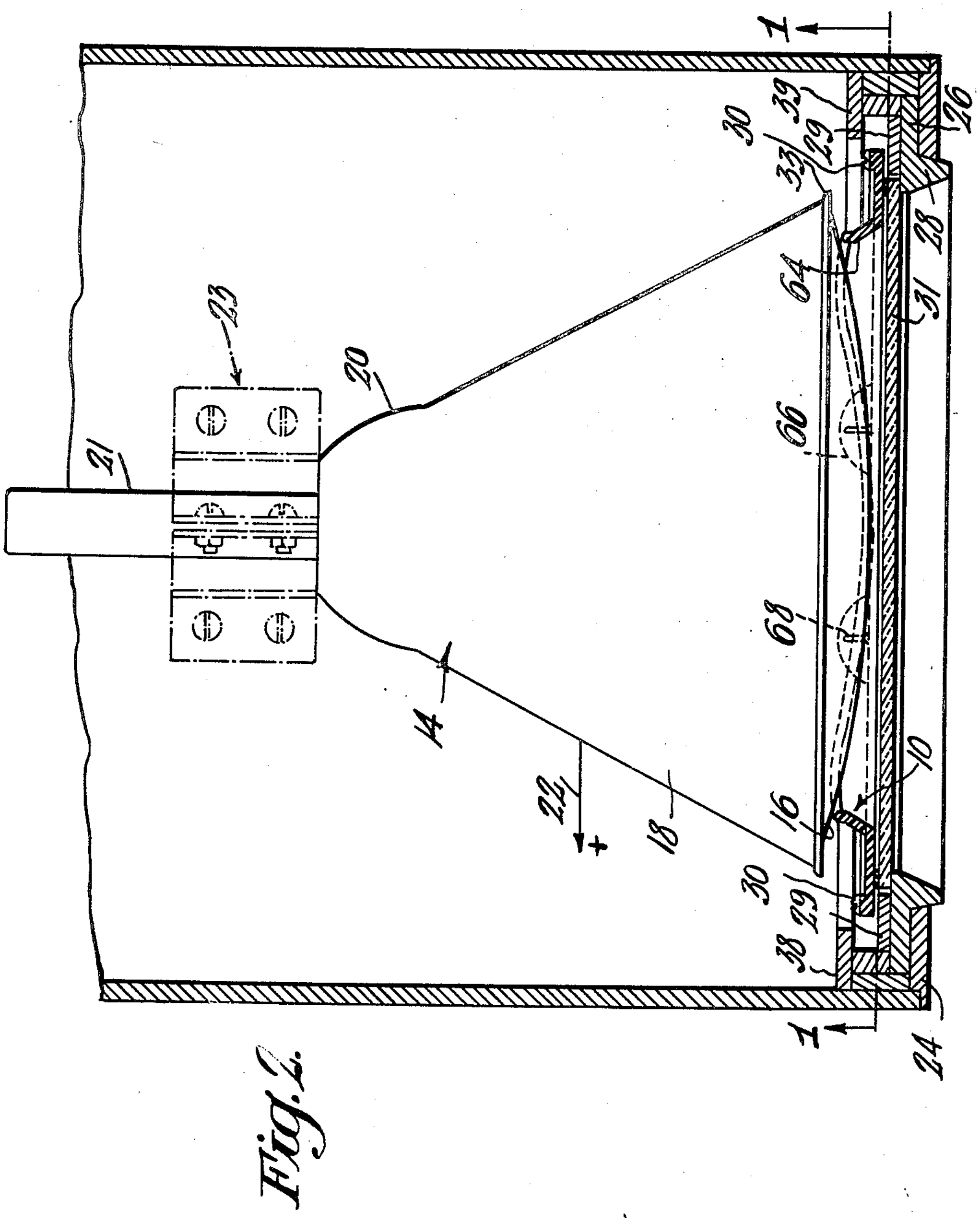
Fig. 2 is a top plan view in section of the apparatus of Fig. 1, the section being taken on line 2—2 of Fig. 1.

The mask 10 is provided with an opening 63 that is of a size and configuration to outline the image area on the end 16 of the cathode ray tube 14. As shown in Fig. 1 of the drawing, this opening 63 is framed by an offset rim 64 which enables the opening 63 to more or less follow the curved contour of the tube face. Preferably the edge or lip of the rim 64, defining the opening, is spaced from the tube face so as to provide a small air gap. This air gap is in series with the surface leakage on the tube face.

The mask 10 is provided with 4 arcuate projections or lips 66 which engage the tube face 16 to limit forward motion of the cathode ray tube 14. The face rests against these lips 66. Each lip 66 is reinforced by a bracing rib 68. The entire mask 10 shown in Figs. 1 and 2 of the drawings, may be molded from plastic material of high insulating value.

What is claimed is:

1. In a cathode ray tube appliance, a structure having means to support the neck of a cathode ray tube of the type having an electrically conductive flaring portion joining an image exhibiting face and the tube neck, means to provide a high voltage connection for the conductive flaring portion of the tube, said last named means comprising an insulating support for the flared end of the conductive portion of the tube, said insulating support having a lip, an aperture in said lip, and a spring member received by the aperture in said lip and being disposed to contact the flared end of the conductive portion of the tube.

2. The combination of claim 1 wherein said spring member is of U-shape having legs bowed at right angles to the plane of the U.

3. The combination of claim 1 wherein there is also provided additional insulating supports for the flared end of the conductive portion of the tube, said additional insulating supports also having a spring member received by each.

4. In a cathode ray tube appliance, a structure having means to support the neck of a cathode ray tube of the type having an electrically conductive flaring portion joining the image exhibiting face and the tube neck, means to provide a high voltage connection for the conductive flaring portion of the tube, said last named means comprising an insulating support for the flared end of the conductive portion of the tube, said insulating support having a lip, an aperture in said lip and a spring member received by said aperture in said lip, said spring member being of U shape and having bent legs to provide for locking engagement with said aperture, said spring member being disposed to contact the flared end of the conductive portion of the tube.

LEWIS H. DAVIS.
SIMEON I. TOURSHOU.

REFERENCES CITED

The following references are of record in the file of this patent:

UNITED STATES PATENTS

| Number | Name | Date |
|---|---|---|
| 2,165,779 | Blain | July 11, 1939 |
| 2,254,090 | Power | Aug. 26, 1941 |
| 2,354,661 | Berejkoff | Aug. 1, 1944 |
| 2,428,928 | Cain | Oct. 14, 1947 |
| 2,458,368 | Kamin et al. | Jan. 4, 1949 |
| 2,497,660 | Devine | Feb. 14, 1950 |

FOREIGN PATENTS

| Number | Country | Date |
|---|---|---|
| 520,412 | Great Britain | Apr. 23, 1940 |